(12) United States Patent
Kong et al.

(10) Patent No.: US 11,705,953 B2
(45) Date of Patent: Jul. 18, 2023

(54) ENVELOPE RATIO METHOD TO IMPROVE BEAM HIERARCHY DESIGN

(71) Applicant: QUALCOMM Incorporated, San Diego, CA (US)

(72) Inventors: Ting Kong, San Diego, CA (US); Farhad Meshkati, San Diego, CA (US); Mihir Vijay Laghate, San Diego, CA (US); Raghu Narayan Challa, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 17/457,875

(22) Filed: Dec. 6, 2021

(65) Prior Publication Data
US 2023/0179282 A1    Jun. 8, 2023

(51) Int. Cl.
*H04B 7/06* (2006.01)

(52) U.S. Cl.
CPC .................. *H04B 7/0695* (2013.01)

(58) Field of Classification Search
CPC ...... H04B 7/0695; H04B 7/088; H04W 16/28
See application file for complete search history.

(56) References Cited

U.S. PATENT DOCUMENTS

| | | | |
|---|---|---|---|
| 11,070,264 B2* | 7/2021 | Li | H04W 48/12 |
| 2005/0094602 A1* | 5/2005 | Gollamudi | H04W 16/28 370/334 |
| 2013/0059619 A1* | 3/2013 | Kim | H04B 7/0617 455/509 |
| 2016/0134352 A1* | 5/2016 | Stirling-Gallacher | H04B 7/0639 370/329 |
| 2020/0007216 A1* | 1/2020 | Nasiri Khormuji | H04B 7/063 |

* cited by examiner

*Primary Examiner* — Sophia Vlahos
(74) *Attorney, Agent, or Firm* — Procopio, Cory, Hargreaves & Savitch LLP

(57) ABSTRACT

A first wireless device may select a first beam for communication with a second wireless device from a first set of beams associated with a first beam level. A second set of beams may be associated with a second beam level. The first beam may be associated with a first children list. The first children list may be associated with a first subset of beams of the second set of beams. Each beam in the first subset of beams may have an envelope area that intersects an envelope area of the first beam. The first wireless device may select a second beam for communication with the second wireless device from the first subset of beams based on an envelope area of the second beam intersecting the envelope area of the first beam. The first wireless device may communicate with the second wireless device.

30 Claims, 9 Drawing Sheets

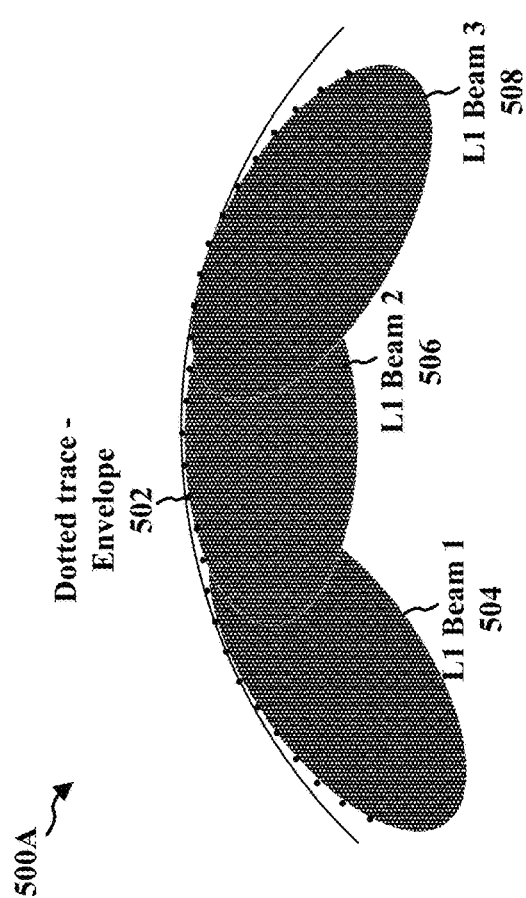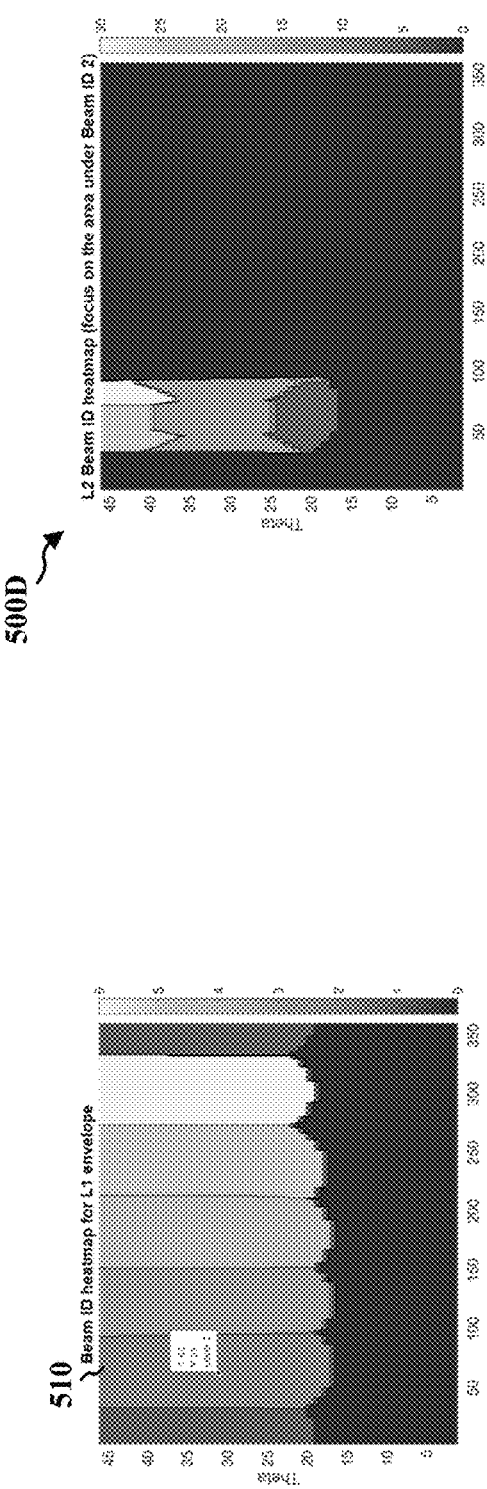
FIG. 5A
FIG. 5B
FIG. 5C
FIG. 5D

ENVELOPE RATIO METHOD TO IMPROVE BEAM HIERARCHY DESIGN

TECHNICAL FIELD

The present disclosure relates generally to communication systems, and more particularly, to a beam hierarchy for beam refinement at a wireless device.

INTRODUCTION

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is 5G New Radio (NR). 5G NR is part of a continuous mobile broadband evolution promulgated by Third Generation Partnership Project (3GPP) to meet new requirements associated with latency, reliability, security, scalability (e.g., with Internet of Things (IoT)), and other requirements. 5G NR includes services associated with enhanced mobile broadband (eMBB), massive machine type communications (mMTC), and ultra-reliable low latency communications (URLLC). Some aspects of 5G NR may be based on the 4G Long Term Evolution (LTE) standard. There exists a need for further improvements in 5G NR technology. These improvements may also be applicable to other multi-access technologies and the telecommunication standards that employ these technologies.

BRIEF SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

In an aspect of the disclosure, a method, a computer-readable medium, and an apparatus are provided. The apparatus may be a first wireless device. The apparatus may select a first beam for communication with a second wireless device from a first set of beams associated with a first beam level. A second set of beams may be associated with a second beam level. The first beam may be associated with a first children list. The first children list may be associated with a first subset of beams of the second set of beams. Each beam in the first subset of beams may have an envelope area that intersects an envelope area of the first beam. The apparatus may select a second beam for communication with the second wireless device from the first subset of beams based on an envelope area of the second beam intersecting the envelope area of the first beam. The apparatus may communicate with the second wireless device through at least one of the selected first beam or the selected second beam.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

FIG. 5A is a diagram illustrating an example envelope according to one aspect.

FIG. 5B is a diagram illustrating an example L1 envelope associated with L1 beams according to one aspect.

FIG. 5C is a diagram illustrating example L1 envelope areas associated with L1 beams according to one aspect.

FIG. 5D is a diagram illustrating example L2 envelope areas associated with some L2 beams inside the L1 envelope area of the L1 Beam #2 according to one aspect.

DETAILED DESCRIPTION

Figure 1:
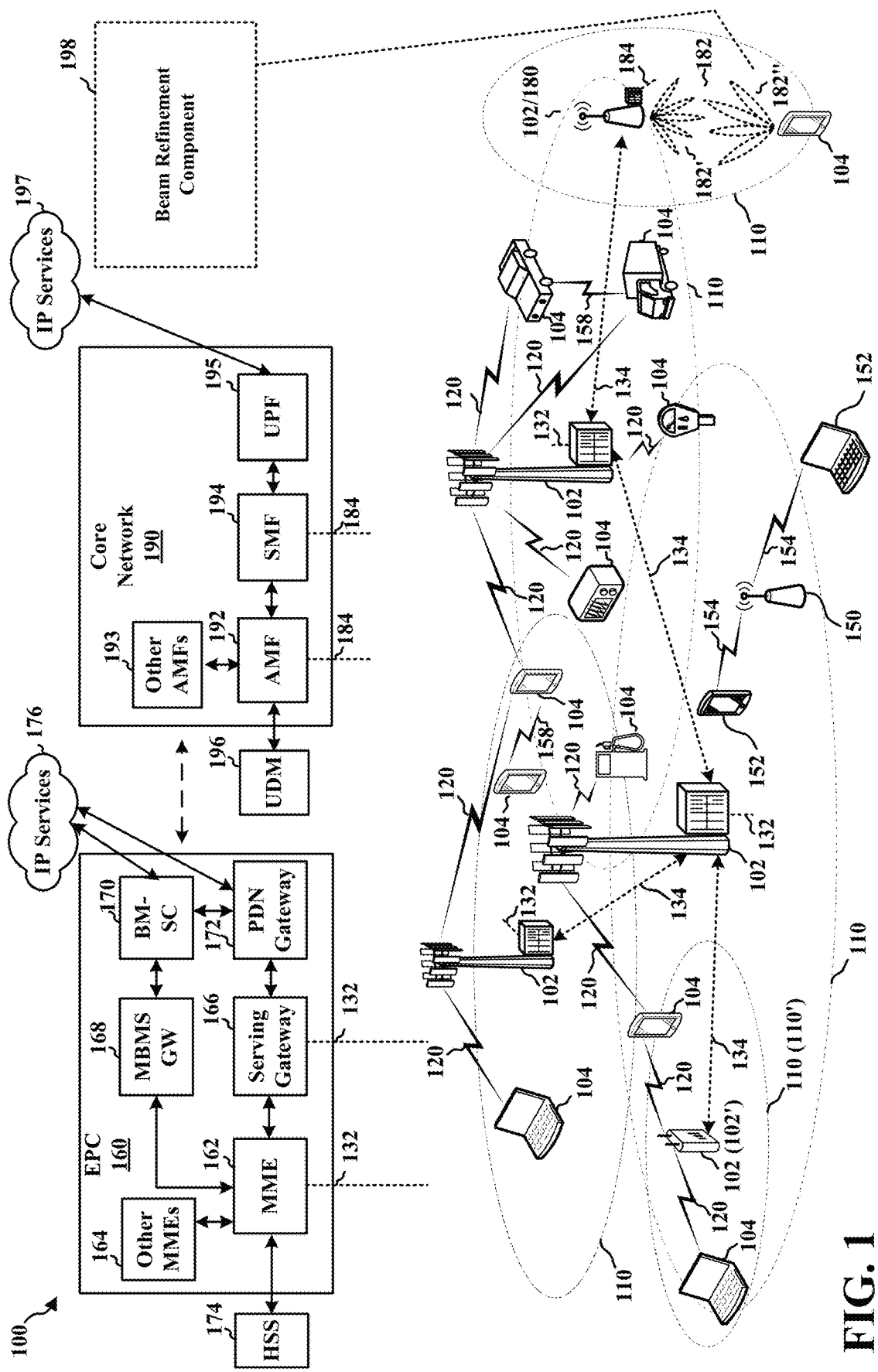
FIG. 1 is a diagram illustrating an example of a wireless communications system and an access network.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more example embodiments, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EEPROM), optical disk storage, magnetic disk storage, other magnetic storage devices, combinations of the types of computer-readable media, or any other medium that can be used to store computer executable code in the form of instructions or data structures that can be accessed by a computer.

While aspects and implementations are described in this application by illustration to some examples, those skilled in the art will understand that additional implementations and use cases may come about in many different arrangements and scenarios. Innovations described herein may be implemented across many differing platform types, devices, systems, shapes, sizes, and packaging arrangements. For example, implementations and/or uses may come about via integrated chip implementations and other non-module-component based devices (e.g., end-user devices, vehicles, communication devices, computing devices, industrial equipment, retail/purchasing devices, medical devices, artificial intelligence (AI)-enabled devices, etc.). While some examples may or may not be specifically directed to use cases or applications, a wide assortment of applicability of described innovations may occur. Implementations may range a spectrum from chip-level or modular components to non-modular, non-chip-level implementations and further to aggregate, distributed, or original equipment manufacturer (OEM) devices or systems incorporating one or more aspects of the described innovations. In some practical settings, devices incorporating described aspects and features may also include additional components and features for implementation and practice of claimed and described aspect. For example, transmission and reception of wireless signals necessarily includes a number of components for analog and digital purposes (e.g., hardware components including antenna, RF-chains, power amplifiers, modulators, buffer, processor(s), interleaver, adders/summers, etc.). It is intended that innovations described herein may be practiced in a wide variety of devices, chip-level components, systems, distributed arrangements, aggregated or disaggregated components, end-user devices, etc. of varying sizes, shapes, and constitution.

FIG. 1 is a diagram illustrating an example of a wireless communications system and an access network 100. The wireless communications system (also referred to as a wireless wide area network (WWAN)) includes base stations 102, UEs 104, an Evolved Packet Core (EPC) 160, and another core network 190 (e.g., a 5G Core (5GC)). The base stations 102 may include macrocells (high power cellular base station) and/or small cells (low power cellular base station). The macrocells include base stations. The small cells include femtocells, picocells, and microcells.

The base stations 102 configured for 4G LTE (collectively referred to as Evolved Universal Mobile Telecommunications System (UMTS) Terrestrial Radio Access Network (E-UTRAN)) may interface with the EPC 160 through first backhaul links 132 (e.g., S1 interface). The base stations 102 configured for 5G NR (collectively referred to as Next Generation RAN (NG-RAN)) may interface with core network 190 through second backhaul links 184. In addition to other functions, the base stations 102 may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, and delivery of warning messages. The base stations 102 may communicate directly or indirectly (e.g., through the EPC 160 or core network 190) with each other over third backhaul links 134 (e.g., X2 interface). The first backhaul links 132, the second backhaul links 184, and the third backhaul links 134 may be wired or wireless.

The base stations 102 may wirelessly communicate with the UEs 104. Each of the base stations 102 may provide communication coverage for a respective geographic coverage area 110. There may be overlapping geographic coverage areas 110. For example, the small cell 102' may have a coverage area 110' that overlaps the coverage area 110 of one or more macro base stations 102. A network that includes both small cell and macrocells may be known as a heterogeneous network. A heterogeneous network may also include Home Evolved Node Bs (eNBs) (HeNBs), which may provide service to a restricted group known as a closed subscriber group (CSG). The communication links 120 between the base stations 102 and the UEs 104 may include uplink (UL) (also referred to as reverse link) transmissions from a UE 104 to a base station 102 and/or downlink (DL) (also referred to as forward link) transmissions from a base station 102 to a UE 104. The communication links 120 may use multiple-input and multiple-output (MIMO) antenna technology, including spatial multiplexing, beamforming, and/or transmit diversity. The communication links may be through one or more carriers. The base stations 102/UEs 104 may use spectrum up to Y MHz (e.g., 5, 10, 15, 20, 100, 400, etc. MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or fewer carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Certain UEs 104 may communicate with each other using device-to-device (D2D) communication link 158. The D2D communication link 158 may use the DL/UL WWAN spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, WiMedia, Bluetooth, ZigBee, Wi-Fi based on the Institute of Electrical and Electronics Engineers (IEEE) 802.11 standard, LTE, or NR.

The wireless communications system may further include a Wi-Fi access point (AP) 150 in communication with Wi-Fi stations (STAs) 152 via communication links 154, e.g., in a 5 GHz unlicensed frequency spectrum or the like. When communicating in an unlicensed frequency spectrum, the STAs 152/AP 150 may perform a clear channel assessment (CCA) prior to communicating in order to determine whether the channel is available.

The small cell 102' may operate in a licensed and/or an unlicensed frequency spectrum. When operating in an unlicensed frequency spectrum, the small cell 102' may employ NR and use the same unlicensed frequency spectrum (e.g., 5 GHz, or the like) as used by the Wi-Fi AP 150. The small cell 102', employing NR in an unlicensed frequency spectrum, may boost coverage to and/or increase capacity of the access network.

The electromagnetic spectrum is often subdivided, based on frequency/wavelength, into various classes, bands, channels, etc. In 5G NR, two initial operating bands have been identified as frequency range designations FR1 (410 MHz-7.125 GHz) and FR2 (24.25 GHz-52.6 GHz). Although a portion of FR1 is greater than 6 GHz, FR1 is often referred to (interchangeably) as a "sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHz-24.25 GHz). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR2-2 (52.6 GHz-71 GHz), FR4 (71 GHz-114.25 GHz), and FR5 (114.25 GHz-300 GHz). Each of these higher frequency bands falls within the EHF band.

With the above aspects in mind, unless specifically stated otherwise, it should be understood that the term "sub-6 GHz" or the like if used herein may broadly represent frequencies that may be less than 6 GHz, may be within FR1, or may include mid-band frequencies. Further, unless specifically stated otherwise, it should be understood that the term "millimeter wave" or the like if used herein may broadly represent frequencies that may include mid-band frequencies, may be within FR2, FR4, FR2-2, and/or FR5, or may be within the EHF band.

A base station 102, whether a small cell 102' or a large cell (e.g., macro base station), may include and/or be referred to as an eNB, gNodeB (gNB), or another type of base station. Some base stations, such as gNB 180 may operate in a traditional sub 6 GHz spectrum, in millimeter wave frequencies, and/or near millimeter wave frequencies in communication with the UE 104. When the gNB 180 operates in millimeter wave or near millimeter wave frequencies, the gNB 180 may be referred to as a millimeter wave base station. The millimeter wave base station 180 may utilize beamforming 182 with the UE 104 to compensate for the path loss and short range. The base station 180 and the UE 104 may each include a plurality of antennas, such as antenna elements, antenna panels, and/or antenna arrays to facilitate the beamforming.

The base station 180 may transmit a beamformed signal to the UE 104 in one or more transmit directions 182'. The UE 104 may receive the beamformed signal from the base station 180 in one or more receive directions 182". The UE 104 may also transmit a beamformed signal to the base station 180 in one or more transmit directions. The base station 180 may receive the beamformed signal from the UE 104 in one or more receive directions. The base station 180/UE 104 may perform beam training to determine the best receive and transmit directions for each of the base station 180/UE 104. The transmit and receive directions for the base station 180 may or may not be the same. The transmit and receive directions for the UE 104 may or may not be the same.

The EPC 160 may include a Mobility Management Entity (MME) 162, other MMEs 164, a Serving Gateway 166, a Multimedia Broadcast Multicast Service (MBMS) Gateway 168, a Broadcast Multicast Service Center (BM-SC) 170, and a Packet Data Network (PDN) Gateway 172. The MME 162 may be in communication with a Home Subscriber Server (HSS) 174. The MME 162 is the control node that processes the signaling between the UEs 104 and the EPC 160. Generally, the MME 162 provides bearer and connection management. All user Internet protocol (IP) packets are transferred through the Serving Gateway 166, which itself is connected to the PDN Gateway 172. The PDN Gateway 172 provides UE IP address allocation as well as other functions. The PDN Gateway 172 and the BM-SC 170 are connected to the IP Services 176. The IP Services 176 may include the Internet, an intranet, an IP Multimedia Subsystem (IMS), a PS Streaming Service, and/or other IP services. The BM-SC 170 may provide functions for MBMS user service provisioning and delivery. The BM-SC 170 may serve as an entry point for content provider MBMS transmission, may be used to authorize and initiate MBMS Bearer Services within a public land mobile network (PLMN), and may be used to schedule MBMS transmissions. The MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

The core network 190 may include an Access and Mobility Management Function (AMF) 192, other AMFs 193, a Session Management Function (SMF) 194, and a User Plane Function (UPF) 195. The AMF 192 may be in communication with a Unified Data Management (UDM) 196. The AMF 192 is the control node that processes the signaling between the UEs 104 and the core network 190. Generally, the AMF 192 provides QoS flow and session management. All user Internet protocol (IP) packets are transferred through the UPF 195. The UPF 195 provides UE IP address allocation as well as other functions. The UPF 195 is connected to the IP Services 197. The IP Services 197 may include the Internet, an intranet, an IP Multimedia Subsystem (IMS), a Packet Switch (PS) Streaming (PSS) Service, and/or other IP services.

The base station may include and/or be referred to as a gNB, Node B, eNB, an access point, a base transceiver station, a radio base station, a radio transceiver, a transceiver function, a basic service set (BSS), an extended service set (ESS), a transmit reception point (TRP), or some other suitable terminology. The base station 102 provides an access point to the EPC 160 or core network 190 for a UE 104. Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a sensor/actuator, a display, or any other similar functioning device. Some of the UEs 104 may be referred to as IoT devices (e.g., parking meter, gas pump, toaster, vehicles, heart monitor, etc.). The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology. In some scenarios, the term UE may also apply to one or more companion devices such as in a device constellation arrangement. One or more of these devices may collectively access the network and/or individually access the network.

Referring again to FIG. 1, in certain aspects, the UE 104 may include a beam refinement component 198 that may be configured to select a first beam for communication with a second wireless device from a first set of beams associated with a first beam level. A second set of beams may be associated with a second beam level. The first beam may be associated with a first children list. The first children list may be associated with a first subset of beams of the second set of beams. Each beam in the first subset of beams may have an envelope area that intersects an envelope area of the first beam. The beam refinement component 198 may be configured to select a second beam for communication with the second wireless device from the first subset of beams based on an envelope area of the second beam intersecting the envelope area of the first beam. The beam refinement component 198 may be configured to communicate with the second wireless device through at least one of the selected first beam or the selected second beam. In addition to being performed at a UE 104, the operations may also be performed at another other suitable wireless device, such as a base station 102/180, a customer premises equipment (CPE), etc. Although the following description may be focused on 5G NR, the concepts described herein may be applicable to other similar areas, such as LTE, LTE-A, CDMA, GSM, and other wireless technologies.

Figure 2:
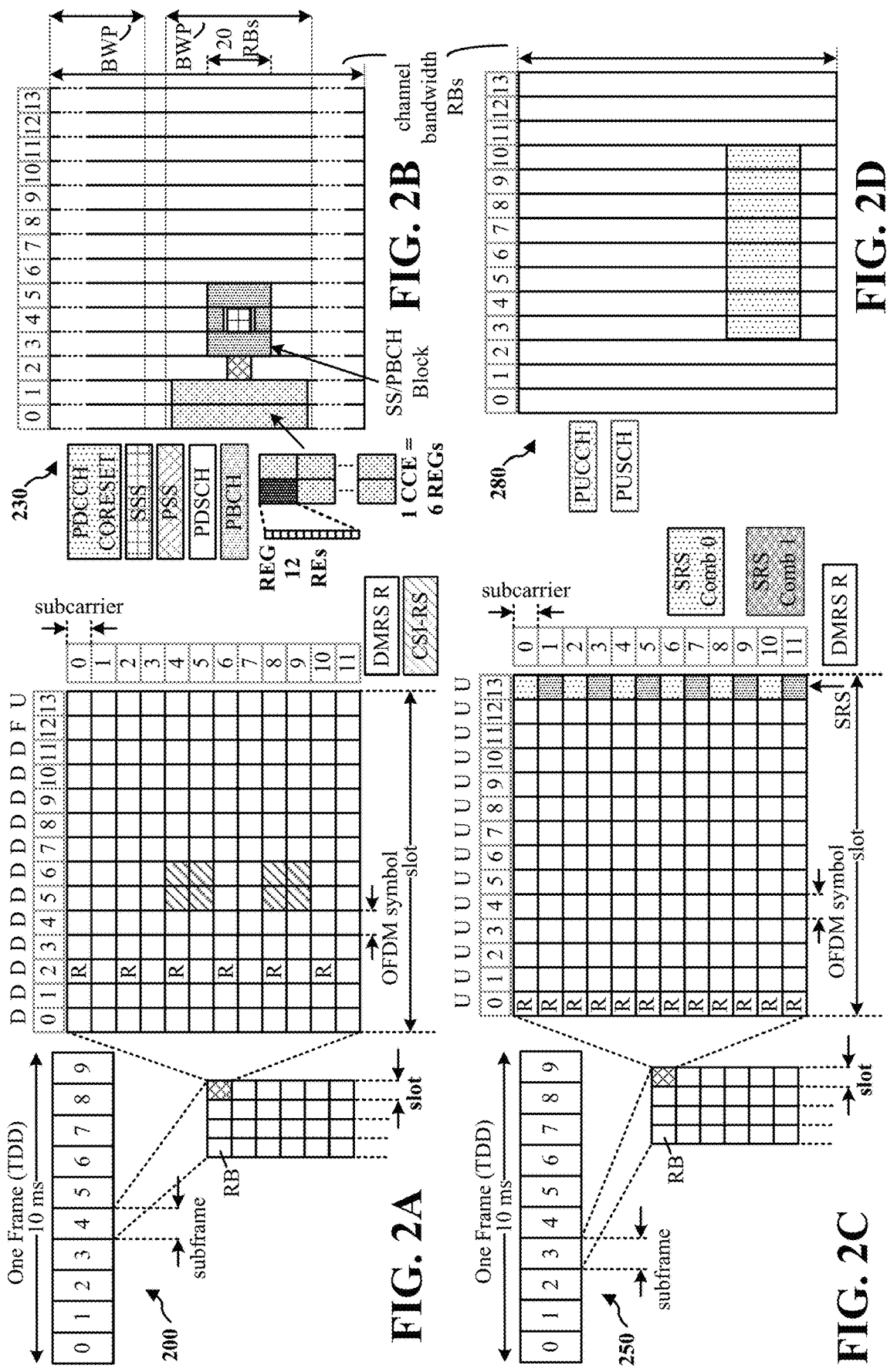
FIG. 2A is a diagram illustrating an example of a first frame, in accordance with various aspects of the present disclosure.
FIG. 2B is a diagram illustrating an example of DL channels within a subframe, in accordance with various aspects of the present disclosure.
FIG. 2C is a diagram illustrating an example of a second frame, in accordance with various aspects of the present disclosure.
FIG. 2D is a diagram illustrating an example of UL channels within a subframe, in accordance with various aspects of the present disclosure.

FIG. 2A is a diagram 200 illustrating an example of a first subframe within a 5G NR frame structure. FIG. 2B is a diagram 230 illustrating an example of DL channels within a 5G NR subframe. FIG. 2C is a diagram 250 illustrating an example of a second subframe within a 5G NR frame structure. FIG. 2D is a diagram 280 illustrating an example of UL channels within a 5G NR subframe. The 5G NR frame structure may be frequency division duplexed (FDD) in which for a particular set of subcarriers (carrier system bandwidth), subframes within the set of subcarriers are dedicated for either DL or UL, or may be time division duplexed (TDD) in which for a particular set of subcarriers (carrier system bandwidth), subframes within the set of subcarriers are dedicated for both DL and UL. In the examples provided by FIGS. 2A, 2C, the 5G NR frame structure is assumed to be TDD, with subframe 4 being configured with slot format 28 (with mostly DL), where D is DL, U is UL, and F is flexible for use between DL/UL, and subframe 3 being configured with slot format 1 (with all UL). While subframes 3, 4 are shown with slot formats 1, 28, respectively, any particular subframe may be configured with any of the various available slot formats 0-61. Slot formats 0, 1 are all DL, UL, respectively. Other slot formats 2-61 include a mix of DL, UL, and flexible symbols. UEs are configured with the slot format (dynamically through DL control information (DCI), or semi-statically/statically through radio resource control (RRC) signaling) through a received slot format indicator (SFI). Note that the description infra applies also to a 5G NR frame structure that is TDD.

FIGS. 2A-2D illustrate a frame structure, and the aspects of the present disclosure may be applicable to other wireless communication technologies, which may have a different frame structure and/or different channels. A frame (10 ms) may be divided into 10 equally sized subframes (1 ms). Each subframe may include one or more time slots. Subframes may also include mini-slots, which may include 7, 4, or 2 symbols. Each slot may include 14 or 12 symbols, depending on whether the cyclic prefix (CP) is normal or extended. For normal CP, each slot may include 14 symbols, and for extended CP, each slot may include 12 symbols. The symbols on DL may be CP orthogonal frequency division multiplexing (OFDM) (CP-OFDM) symbols. The symbols on UL may be CP-OFDM symbols (for high throughput scenarios) or discrete Fourier transform (DFT) spread OFDM (DFT-s-OFDM) symbols (also referred to as single carrier frequency-division multiple access (SC-FDMA) symbols) (for power limited scenarios; limited to a single stream transmission). The number of slots within a subframe is based on the CP and the numerology. The numerology defines the subcarrier spacing (SCS) and, effectively, the symbol length/duration, which is equal to 1/SCS.

| μ | SCS<br>$\Delta f = 2^\mu \cdot 15$ [kHz] | Cyclic prefix |
|---|---|---|
| 0 | 15 | Normal |
| 1 | 30 | Normal |
| 2 | 60 | Normal, Extended |
| 3 | 120 | Normal |
| 4 | 240 | Normal |

For normal CP (14 symbols/slot), different numerologies μ 0 to 4 allow for 1, 2, 4, 8, and 16 slots, respectively, per subframe. For extended CP, the numerology 2 allows for 4 slots per subframe. Accordingly, for normal CP and numerology μ, there are 14 symbols/slot and $2^\mu$ slots/subframe. The subcarrier spacing may be equal to $2^\mu * 15$ kHz, where μ is the numerology 0 to 4. As such, the numerology μ=0 has a subcarrier spacing of 15 kHz and the numerology μ=4 has a subcarrier spacing of 240 kHz. The symbol length/duration is inversely related to the subcarrier spacing. FIGS. 2A-2D provide an example of normal CP with 14 symbols per slot and numerology μ=2 with 4 slots per subframe. The slot duration is 0.25 ms, the subcarrier spacing is 60 kHz, and the symbol duration is approximately 16.67 μs. Within a set of frames, there may be one or more different bandwidth parts (BWPs) (see FIG. 2B) that are frequency division multiplexed. Each BWP may have a particular numerology and CP (normal or extended).

A resource grid may be used to represent the frame structure. Each time slot includes a resource block (RB) (also referred to as physical RBs (PRBs)) that extends 12 consecutive subcarriers. The resource grid is divided into multiple resource elements (REs). The number of bits carried by each RE depends on the modulation scheme.

As illustrated in FIG. 2A, some of the REs carry reference (pilot) signals (RS) for the UE. The RS may include demodulation RS (DM-RS) (indicated as R for one particular configuration, but other DM-RS configurations are possible) and channel state information reference signals (CSI-RS) for channel estimation at the UE. The RS may also include beam measurement RS (BRS), beam refinement RS (BRRS), and phase tracking RS (PT-RS).

FIG. 2B illustrates an example of various DL channels within a subframe of a frame. The physical downlink control channel (PDCCH) carries DCI within one or more control channel elements (CCEs) (e.g., 1, 2, 4, 8, or 16 CCEs), each CCE including six RE groups (REGs), each REG including 12 consecutive REs in an OFDM symbol of an RB. A PDCCH within one BWP may be referred to as a control resource set (CORESET). A UE is configured to monitor PDCCH candidates in a PDCCH search space (e.g., common search space, UE-specific search space) during PDCCH monitoring occasions on the CORESET, where the PDCCH candidates have different DCI formats and different aggregation levels. Additional BWPs may be located at greater and/or lower frequencies across the channel bandwidth. A primary synchronization signal (PSS) may be within symbol 2 of particular subframes of a frame. The PSS is used by a UE 104 to determine subframe/symbol timing and a physical layer identity. A secondary synchronization signal (SSS) may be within symbol 4 of particular subframes of a frame. The SSS is used by a UE to determine a physical layer cell identity group number and radio frame timing. Based on the physical layer identity and the physical layer cell identity group number, the UE can determine a physical cell identifier (PCI). Based on the PCI, the UE can determine the locations of the DM-RS. The physical broadcast channel (PBCH), which carries a master information block (MIB), may be logically grouped with the PSS and SSS to form a synchronization signal (SS)/PBCH block (also referred to as SS block (SSB)). The MIB provides a number of RBs in the system bandwidth and a system frame number (SFN). The physical downlink shared channel (PDSCH) carries user data, broadcast system information not transmitted through the PBCH such as system information blocks (SIBs), and paging messages.

As illustrated in FIG. 2C, some of the REs carry DM-RS (indicated as R for one particular configuration, but other DM-RS configurations are possible) for channel estimation at the base station. The UE may transmit DM-RS for the physical uplink control channel (PUCCH) and DM-RS for the physical uplink shared channel (PUSCH). The PUSCH DM-RS may be transmitted in the first one or two symbols of the PUSCH. The PUCCH DM-RS may be transmitted in different configurations depending on whether short or long PUCCHs are transmitted and depending on the particular PUCCH format used. The UE may transmit sounding reference signals (SRS). The SRS may be transmitted in the last symbol of a subframe. The SRS may have a comb structure, and a UE may transmit SRS on one of the combs. The SRS may be used by a base station for channel quality estimation to enable frequency-dependent scheduling on the UL.

FIG. 2D illustrates an example of various UL channels within a subframe of a frame. The PUCCH may be located as indicated in one configuration. The PUCCH carries uplink control information (UCI), such as scheduling requests, a channel quality indicator (CQI), a precoding matrix indicator (PMI), a rank indicator (RI), and hybrid automatic repeat request (HARQ) acknowledgment (ACK) (HARQ-ACK) feedback (i.e., one or more HARQ ACK bits indicating one or more ACK and/or negative ACK (NACK)). The PUSCH carries data, and may additionally be used to carry a buffer status report (BSR), a power headroom report (PHR), and/or UCI.

Figure 3:
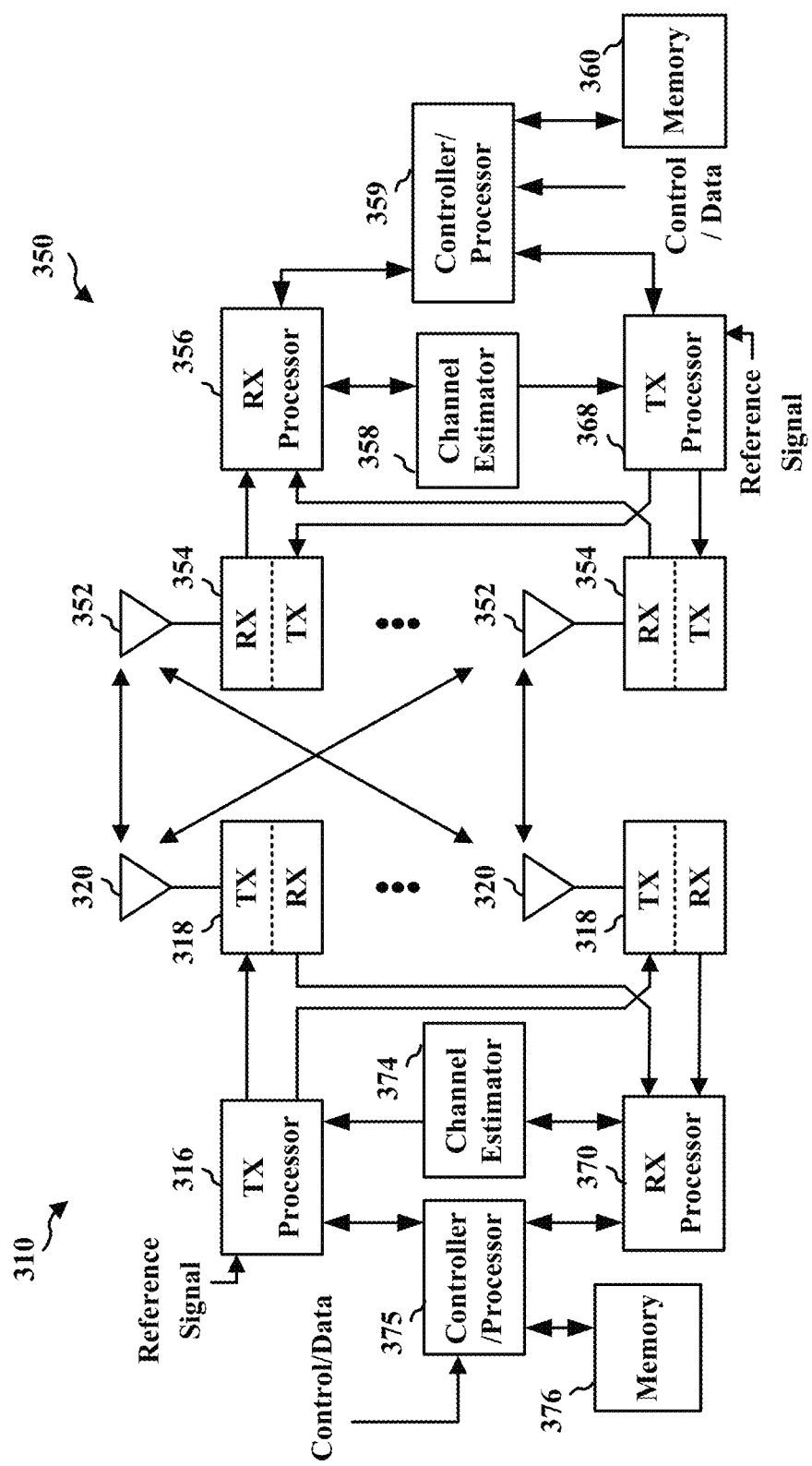
FIG. 3 is a diagram illustrating an example of a base station and user equipment (UE) in an access network.

FIG. 3 is a block diagram of a base station 310 in communication with a UE 350 in an access network. In the DL, IP packets from the EPC 160 may be provided to a controller/processor 375. The controller/processor 375 implements layer 3 and layer 2 functionality. Layer 3 includes a radio resource control (RRC) layer, and layer 2 includes a service data adaptation protocol (SDAP) layer, a packet data convergence protocol (PDCP) layer, a radio link control (RLC) layer, and a medium access control (MAC) layer. The controller/processor 375 provides RRC layer functionality associated with broadcasting of system information (e.g., MIB, SIBs), RRC connection control (e.g., RRC connection paging, RRC connection establishment, RRC connection modification, and RRC connection release), inter radio access technology (RAT) mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through ARQ, concatenation, segmentation, and reassembly of RLC service data units (SDUs), re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through HARQ, priority handling, and logical channel prioritization.

The transmit (TX) processor 316 and the receive (RX) processor 370 implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 316 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 374 may be used to determine the coding and modulation scheme, as well as for spatial processing. The channel estimate may be derived from a reference signal and/or channel condition feedback transmitted by the UE 350. Each spatial stream may then be provided to a different antenna 320 via a separate transmitter 318 TX. Each transmitter 318 TX may modulate a radio frequency (RF) carrier with a respective spatial stream for transmission.

At the UE 350, each receiver 354 RX receives a signal through its respective antenna 352. Each receiver 354 RX recovers information modulated onto an RF carrier and provides the information to the receive (RX) processor 356. The TX processor 368 and the RX processor 356 implement layer 1 functionality associated with various signal processing functions. The RX processor 356 may perform spatial processing on the information to recover any spatial streams destined for the UE 350. If multiple spatial streams are destined for the UE 350, they may be combined by the RX processor 356 into a single OFDM symbol stream. The RX processor 356 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by the base station 310. These soft decisions may be based on channel estimates computed by the channel estimator 358. The soft decisions are then decoded and deinterleaved to recover the data and control signals that were originally transmitted by the base station 310 on the physical channel. The data and control signals are then provided to the controller/processor 359, which implements layer 3 and layer 2 functionality.

The controller/processor 359 can be associated with a memory 360 that stores program codes and data. The memory 360 may be referred to as a computer-readable medium. In the UL, the controller/processor 359 provides demultiplexing between transport and logical channels, packet reassembly, deciphering, header decompression, and control signal processing to recover IP packets from the EPC 160. The controller/processor 359 is also responsible for error detection using an ACK and/or NACK protocol to support HARQ operations.

Similar to the functionality described in connection with the DL transmission by the base station 310, the controller/processor 359 provides RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by a channel estimator 358 from a reference signal or feedback transmitted by the base station 310 may be used by the TX processor 368 to select the appropriate coding and modulation schemes, and to facilitate spatial processing. The spatial streams generated by the TX processor 368 may be provided to different antenna 352 via separate transmitters 354TX. Each transmitter 354TX may modulate an RF carrier with a respective spatial stream for transmission.

The UL transmission is processed at the base station 310 in a manner similar to that described in connection with the receiver function at the UE 350. Each receiver 318RX receives a signal through its respective antenna 320. Each receiver 318RX recovers information modulated onto an RF carrier and provides the information to a RX processor 370.

The controller/processor 375 can be associated with a memory 376 that stores program codes and data. The memory 376 may be referred to as a computer-readable medium. In the UL, the controller/processor 375 provides demultiplexing between transport and logical channels, packet reassembly, deciphering, header decompression, control signal processing to recover IP packets from the UE 350. IP packets from the controller/processor 375 may be provided to the EPC 160. The controller/processor 375 is also responsible for error detection using an ACK and/or NACK protocol to support HARQ operations.

At least one of the TX processor 368, the RX processor 356, and the controller/processor 359 may be configured to perform aspects in connection with 198 of FIG. 1.

Figure 4:
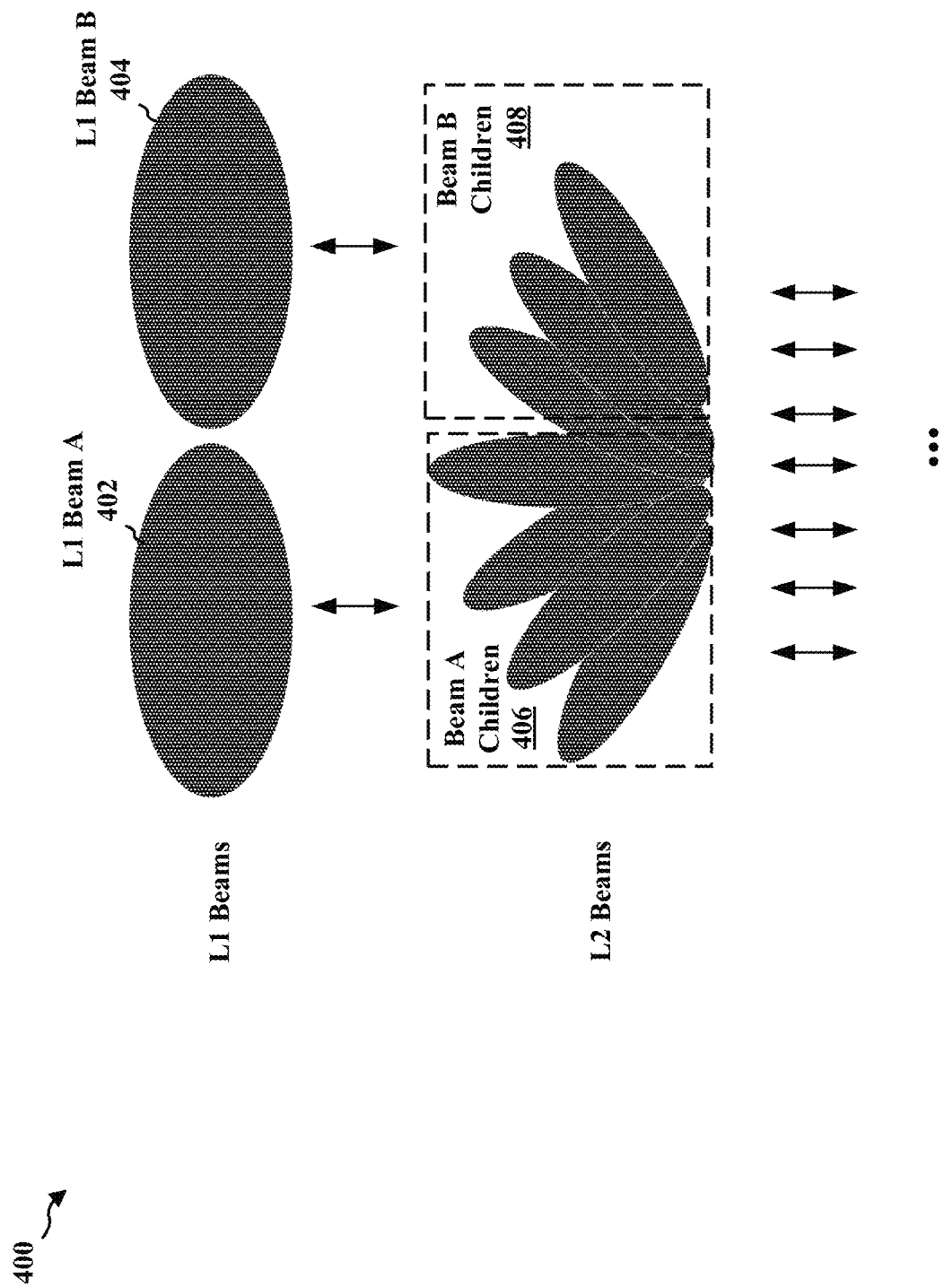
FIG. 4 is a diagram illustrating an example beam hierarchy design.

FIG. 4 is a diagram 400 illustrating an example beam hierarchy design. The communication in the millimeter wave (mmW) band may rely on a robust antenna array gain (or simply "array gain," also known as a beamforming gain). In general, a wider beam may be associated with a larger coverage area, but may be associated with a lower array gain. In contrast, a narrower beam may be associated with a smaller coverage area, but may be associated with a higher array gain. It may take a wireless device (e.g., a UE, a base station, a CPE, etc.) a significant period of time to measure a large number of different narrow beams (e.g., based on the reference signal received power (RSRP) measurement) in order to find the most suitable narrow beam (e.g., the narrow beam associated with the highest array gain) for communication with another device. To accelerate the process of finding the most suitable narrow beam, a beam refinement process based on a beam hierarchy may be utilized.

In the beam hierarchy, lower level beams may correspond to wider beams, and higher level beams may correspond to narrower beams. Based on beam characteristics, a lower level beam may be associated with one or more higher level beams, such that if a lower level beam is the most suitable beam among the beams at the same lower level for communication with a particular device, the most suitable higher level beam at a particular higher level for communication with the device may be found among the higher level beams that are associated with lower level beam. In other words, the number of higher level beams to be measured for communication with a particular device may be reduced as the higher level beams not associated with the most suitable lower level beam may not be measured. Accordingly, the time it takes for the wireless device to find the most suitable higher level beam may be reduced. The relationship between a lower level beam and the higher level beams associated with the lower level beam may be embodied in a children list associated with the lower level beam. To facilitate the beam refinement process, a wireless device may be preconfigured with children lists associated with the beams other than those at the highest beam level. For example, in FIG. 4, two wider level 1 (L1) beams are illustrated: L1 Beam A 402 and L1 Beam B 404. Further, seven narrower level 2 (L2) beams are illustrated. According to the respective children list, the four L2 beams 406 on the left may be associated with the L1 Beam A, and may be referred to as the child beams 406 of the L1 Beam A 402, with the L1 Beam A 402 being the parent beam. The three L2 beams 408 on the right may be associated with the L1 Beam B 404, and may be referred to as the child beams of the L2 Beam B 404, with the L2 Beam B being the parent beam.

Accordingly, based on the beam hierarchy design and the children lists, the process of finding the most suitable narrower beam may be accelerated. In particular, based on the children lists, a level-by-level beam refinement process may be utilized, where a most suitable beam may be found at each level taking into account the most suitable beam found at the previous lower level and the corresponding children list. The beam hierarchy may include more than two levels. Therefore, for example, after finding the most suitable L2 beam, the wireless device may, based on the children list associated with the most suitable L2 beam, proceed to try to find the most suitable L3 beam, which may deliver an even higher array gain than the most suitable L2 beam, and so on. It may be desirable for a children list to be both accurate (e.g., the most suitable higher level beam is in fact included in the children list associated with the most suitable beam found at the previous lower level) and non-redundant (e.g., higher level beams that are not likely to be the most suitable are not included in the respective children list). Further, it may also be desirable for child beams in a children list to be suitably ordered. In particular, the child beams may be ordered such that a higher level child beam more likely to be the most suitable higher level beam may be placed before another high level child beam that is less likely to be the most suitable higher level beam. Accordingly, the wireless device may measure the higher level child beams based on the order they appear in the children list, and the most suitable higher level child beam may be measured sooner and found faster than otherwise.

According to an existing solution, a children list including one or more higher level beams may be generated for a lower level beam based on overlap ratios between the coverage area of the lower level beam and the coverage areas of the higher level beams, where the child beams may be placed in the children list in descending order of the overlap ratio. In particular, the overlap ratio of a higher level beam may be defined as:

$$\text{overlap ratio} = \frac{\text{intersection}(\text{coverage}_{parent}, \text{coverage}_{child})}{\text{coverage}_{child}},$$

where intersection ( ) may give the intersection between two or more areas, and coverage$_{parent}$ and coverage$_{child}$ may refer to the 3 dB coverage area (i.e., the area in which the array gain is within a 3 dB difference compared to the peak array gain of the beam) of the lower level beam and the higher level beam, respectively. It should be appreciated that the overlap ratio may not be a direct metric for determining which child beam is most likely to be the most suitable for a certain angle of arrival (AOA). Further, it may be difficult to choose an overlap ratio threshold for identifying whether a higher level beam may be considered a child beam of a particular lower level beam and may be included in the children list associated with the lower level beam. For example, assuming the overlap ratio threshold is x %, if the overlap ratio of a higher level beam with respect to a lower level beam is greater than x %, the higher level beam may be considered a child beam of the lower level beam. If the chosen x is too large, the children list may be underinclusive and incomplete (e.g., not accurate), which may negatively impact the beam refinement process. If the chosen x is too small, the children list may be overinclusive (e.g., redundant), which may slow down the beam refinement process as more higher level beams may be measured according to the children list. Moreover, some child beams may be associated with a same overlap ratio with respect to a parent beam (e.g., the overlap ratio may be a coarse metric). As a result, using the overlap ratio to order (sort) the child beams in a children list may be less effective.

In one or more aspects, the envelope ratio instead of the overlap ratio may be used to generate the children list and order (sort) the child beams in the children list. The envelope may be a direct metric for identifying which child beam is most likely to be the most suitable for a certain AOA. Further, choosing an envelope ratio threshold for identifying whether a higher level beam may be considered a child beam of a particular lower level beam may be straightforward (e.g., the envelope ratio threshold may be 0). Moreover, it may be unlikely for more than one child beam to be associated with a same envelope ratio with respect to a parent beam (e.g., the envelope ratio may be a refined metric). In other words, it may be more effective to use the envelope ratio to sort the child beams in a children list.

FIG. 5A is a diagram 500A illustrating an example envelope according to one aspect. An envelope 502 may be defined point-by-point in a (theta, phi) coordinate system as the maximum array gain across a set of beams at the particular (theta, phi) point:

$$\text{Envelope:} \max_{i} \text{array gain}(\text{beam}_i)$$

The (theta, phi) coordinate system may be associated with a spherical coordinate system, where theta may give the polar angle, and phi may give the azimuthal angle. Accordingly, each (theta, phi) coordinate or (theta, phi) point may be associated with a direction (e.g., an AOA) in three-dimensional space with respect to an origin (e.g., an antenna array). At each (theta, phi) point, one beam in the set of beams (e.g., all beams at the same beam level) may achieve the maximum array gain, and therefore may be associated with the envelope 502. The dotted trace in FIG. 5A may correspond to the envelope 502 associated with the set of beams including the L1 Beam 1 504, L1 Beam 2 506, and L1 Beam 3 508. FIG. 5B is a diagram 500B illustrating an example L1 envelope associated with L1 beams according to one aspect. The different shades of gray may correspond to magnitudes of array gains. As shown in FIG. 5B, with L1 beams, different (theta, phi) points may be associated with different maximum array gains.

FIG. 5C is a diagram 500C illustrating example L1 envelope areas associated with L1 beams according to one aspect. The different shades of gray may correspond to different beam identifiers (IDs). Within beams at the same beam level, each beam may be associated with a (theta, phi) area encompassing all (theta, phi) points where the beam is associated with the envelope (i.e., the maximum array gain). This (theta, phi) area may be referred to as the envelope area of the beam. Accordingly, beams at the same beam level may be associated with non-overlapping envelope areas in the (theta, phi) coordinate system. FIG. 5C shows the envelope areas associated with seven example L1 beams in the (theta, phi) coordinate system. In particular, the area 510 may be the envelope area of the example L1 Beam #2. Based on the definition of the envelope area, the envelope ratio of a child beam and the envelope ratio of a parent beam may be defined as, respectively:

$$\text{envelope ratio (child)} = \frac{\text{intersection}(EnvelopeArea_{parent}, EnvelopeArea_{child})}{EnvelopeArea_{parent}} \quad \text{(Equation 1)}$$

$$\text{envelope ratio (parent)} = \frac{\text{intersection}(EnvelopeArea_{parent}, EnvelopeArea_{child})}{EnvelopeArea_{child}}, \quad \text{(Equation 2)}$$

where intersection ( ) may give the intersection between two or more areas, and $EnvelopeArea_{parent}$ and $EnvelopeArea_{child}$ may refer to the envelope area of the lower level beam and the higher level beam, respectively.

FIG. 5D is a diagram 500D illustrating example L2 envelope areas associated with some L2 beams inside the L1 envelope area of the L1 Beam #2 according to one aspect. The different shades of gray may correspond to different beam IDs. Herein the L1 Beam #2 may be utilized as an example of a lower level (e.g., L1) beam to explain the process of generating a children list associated with a lower level (e.g., L1) beam. To generate the children list associated with the L1 Beam #2, first, the L1 envelope area of the L1 Beam #2 may be identified and calculated. This may be based on identifying the L1 envelope area of the L1 beam #2 (the L1 beam ID heatmap may indicate L1 envelope areas of all L1 beams including the L1 beam #2). Next, L2 envelope areas for all L2 beams (which may be represented in an L2 beam ID heatmap) may be identified and calculated. Thereafter, the envelope ratios of all L2 beams with respect to the L1 Beam #2 may be calculated based on the Equation 1 above. If the envelope ratio of an L2 beam with respect to the L1 Beam #2 is greater than 0 (i.e., if the envelope area of the L2 beam intersects the envelope area of the L1 Beam #2 at all), the L2 beam may be considered a child beam of the L1 Beam #2. Therefore, the children list associated with the L1 Beam #2 may include all child beams of the L1 Beam #2. In one or more examples, the children list may include all child beams in a particular order, such as in descending order of the envelope ratio. FIG. 5D illustrates L2 envelope areas associated with the L2 beams that are the child beams of the L1 Beam #2.

In one or more configurations, a parents list that associates one higher level (e.g., L2) beam with one or more lower level (e.g., L1) parent beams may be generated. For example, the envelope area of the higher level (e.g., L2) beam for which the parents list is to be generated may be identified. Further, the envelope areas of all lower level (e.g., L1) beams may be identified. Thereafter, the envelope ratios of all lower level beams with respect to the higher level beam may be calculated based on the Equation 2 above. If the envelope ratio of a lower level (e.g., L1) beam with respect to the higher level (e.g., L2) beam is greater than 0 (i.e., if the envelope area of the lower level beam intersects the envelope area of the higher level beam at all), the lower level (e.g., L1) beam may be considered a parent beam of the higher level (e.g., L2) beam. Therefore, the parents list associated with the higher level (e.g., L2) beam may include all parent beams of the higher level (e.g., L2) beam. In one or more examples, the parents list may include all parent beams in a particular order, such as in descending order of the envelope ratio. In one or more configurations, based on a parents list associated with a currently used higher level beam, the wireless device may move down the beam hierarchy (i.e., from using a higher level beam to using a lower level beam at the next lower level) when appropriate. In particular, if the currently used higher level beam is a suitable beam, any lower level beam at the next lower level that is not a parent beam of the currently used higher level beam is unlikely to be suitable. Therefore, the wireless device may be preconfigured with parents lists associated with all beams not at the lowest level. When moving down the beam hierarchy, the wireless device may measure the parent beams of the currently used higher level beam based on the parents list associated with the currently used higher level beam, and may skip measuring other lower level beams not included in the parents list associated with the currently used higher level beam. Accordingly, the parents list may help to reduce the time associated with finding the most suitable beam at the next lower level. Similar to the ordering of child beams in a children list, appropriate ordering of parent beams in a parents list may help to further reduce the time associated with finding the most suitable lower level beam, and/or may help to increase the likelihood that the most suitable lower level beam is selected and used.

Therefore, the envelope ratio may be a better metric than the overlap ratio for generating the children list. The envelope may be directly connected to the maximum array gain. For any (theta, phi) point, a beam may be chosen if the beam contributes to the maximum array gain at this point. For beam refinement, as the children list of the most suitable lower level beam is based on envelope areas and envelope ratios, the search for the most suitable higher level beam at the next higher level may be limited to the subset of higher level beams that may contribute to the maximum array gain in the same (theta, phi) area. This may be contrasted with a children list generated based on the overlap ratio: In that case, the child beams may not contribute to the maximum array gain, especially if the overlap ratio threshold is selected to be low.

Therefore, a children list generated based on the envelope ratio metric may be more accurate and non-redundant than a children list generated based on the overlap ratio. A children list generated based on the envelope ratio may be shorter than a children list generated based on the overlap ratio. The envelope ratio may be a refined metric, and may be associated with a more suitable child beam order in the children list than the overlap ratio. Accordingly, in the hierarchical beam refinement process, the wireless device may measure fewer beams, and may be more likely to measure more suitable child beams sooner. The beam refinement process may be completed sooner and faster. The speed improvement may be more pronounced where the beam refinement process involves more levels (e.g., 3 levels, 4 levels, or more).

Furthermore, to avoid a Ping-Pong condition, the wireless device may utilize a hysteresis when deciding whether to switch from one beam to a more suitable beam. In particular, if the performance difference between the current beam and the more suitable beam is less than a threshold, the wireless device may not switch to the more suitable beam. Therefore, to increase the likelihood that the best beam is actually used, it may be desirable for the wireless device to measure the more suitable candidate beam sooner rather than later. In this regard, the envelope ratio-based children list may be of assistance as well because the child beams are properly ordered based on the envelope ratios and the most suitable child beam is likely to be placed before the suboptimal child beams. Accordingly, the wireless device may be more likely to select and use the most suitable child beam, and the communication system performance may be improved.

Table 1 and Table 2 below show example unordered children lists generated based on the overlap ratio and the envelope ratio, respectively.

TABLE 1

Children List based on the Overlap Ratio

| Children of Beam 2 | | | | | | | | | |
|---|---|---|---|---|---|---|---|---|---|
| 7 | 8 | 9 | 10 | 11 | 13 | 14 | 15 | 16 | 17 |
| (Overlap Ratio) 0.84 | 0.89 | 1 | 0.95 | 0.47 | 0.41 | 0.62 | 1 | 1 | 1 |

| Children of Beam 2 | | | | | | | | |
|---|---|---|---|---|---|---|---|---|
| 18 | 19 | 26 | 27 | 28 | 29 | 30 | 31 | 32 |
| (Overlap Ratio) 0.75 | 0.34 | 0.33 | 0.63 | 0.89 | 0.96 | 0.87 | 0.71 | 0.44 |

TABLE 2

Children List based on the Envelope Ratio

| Children of Beam 2 | | | | | | | | |
|---|---|---|---|---|---|---|---|---|
| 9 | 10 | 15 | 16 | 17 | 28 | 29 | 30 | 31 |
| (Envelope Ratio) 0.15 | 0.01 | 0.11 | 0.24 | 0.16 | 0.12 | 0.1 | 0.12 | 0.003 |

As can be seen from Table 1 and Table 2, the children list generated based on the envelope ratio may be approximately 50% shorter than the children list generated based on the overlap ratio. Further, in Table 1, four child beams (Beams 9, 15, 16, and 17) may be associated with the same overlap ratio of 1. The same overlap ratio may render the ordering of the child beams more difficult or less accurate. In contrast, in Table 2, all envelope ratios for the child beams may be different from each other. Accordingly, more suitable or more accurate ordering of the child beams in the children list may be achieved based on the envelope ratios.

Figure 6:
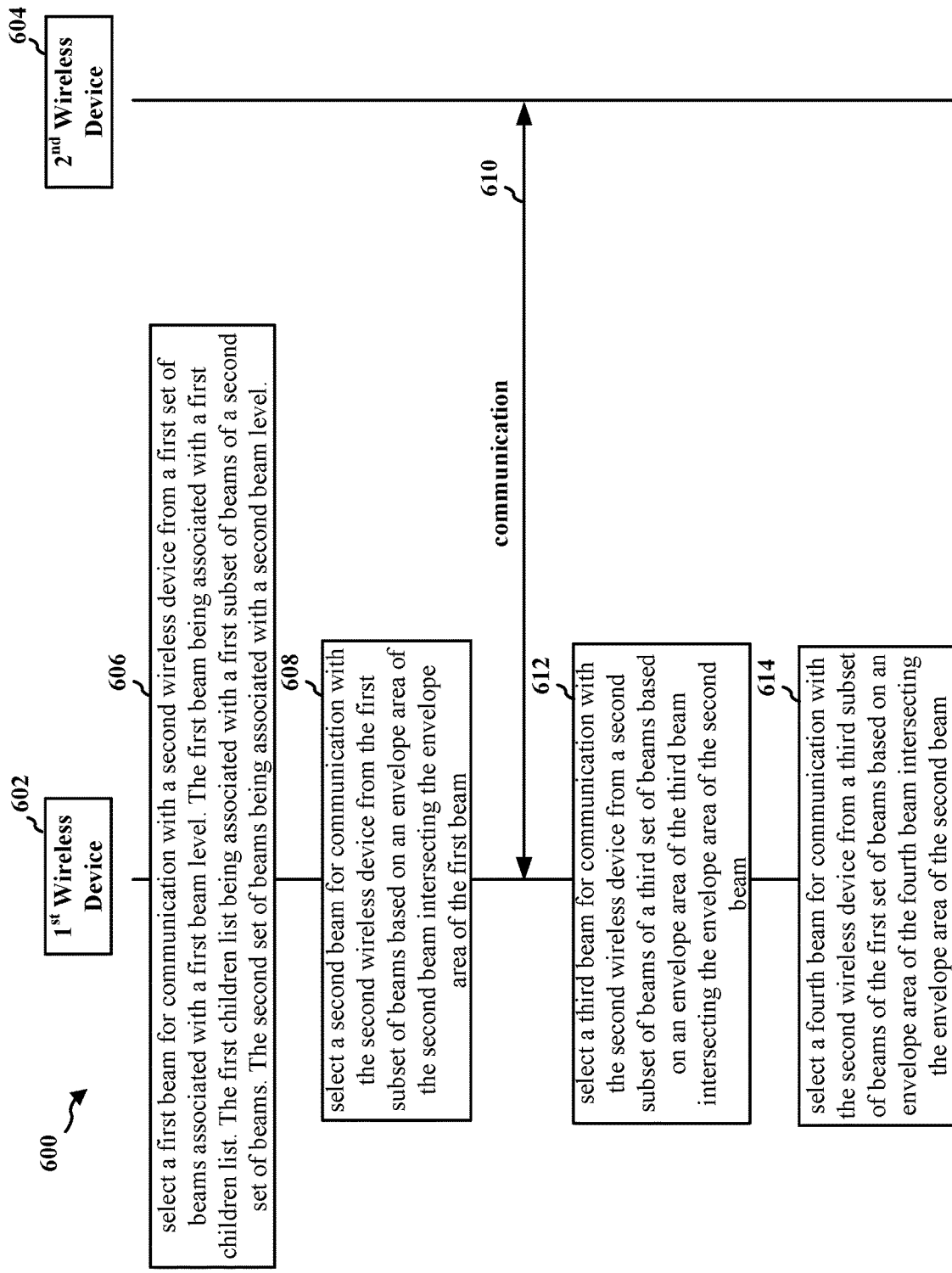
FIG. 6 is a diagram of a communication flow of a method of wireless communication.

FIG. 6 is a diagram illustrating an example communication flow 600 of a method of wireless communication. The first wireless device 602 or the second wireless device 604 may correspond to a base station, a UE, or any other suitable wireless device. At 606, the first wireless device 602 may select a first beam for communication with a second wireless device 604 from a first set of beams associated with a first beam level (e.g., L1). A second set of beams may be associated with a second beam level (e.g., L2). The first beam may be associated with a first children list. The first children list may be associated with a first subset of beams of the second set of beams. Each beam in the first subset of beams may have an envelope area that intersects an envelope area of the first beam.

At 608, the first wireless device 602 may select a second beam for communication with the second wireless device 604 from the first subset of beams based on an envelope area of the second beam intersecting the envelope area of the first beam.

At 610, the first wireless device 602 may communicate with the second wireless device 604 through at least one of the selected first beam or the selected second beam.

In one configuration, the second beam may be narrower than the first beam. The second beam may be associated with a higher array gain for communication with the second wireless device than the first beam.

The envelope area of a particular beam may correspond to a set of directions (e.g., a set of (theta, phi) points) in relation to an antenna array of the first wireless device in which the beam is associated with a higher array gain than any other beams at the same beam level. Accordingly, in one configuration, the envelope area of the first beam may correspond to a first set of directions in relation to an antenna array of the UE in which the first beam is associated with a higher array gain than other beams in the first set of beams. The envelope area of the second beam may correspond to a second set of directions in relation to the antenna array of the first wireless device in which the second beam is associated with a higher array gain than other beams in the second set of beams.

In one configuration, each beam in the first subset of beams may be associated with a respective first envelope ratio of one or more first envelope ratios in relation to the first beam based on a respective proportion of intersection between the envelope area of the respective beam in the first subset of beams and the envelope area of the first beam.

In one configuration, to select the second beam, the first wireless device 602 may measure a plurality of array gains associated with a plurality of beams in the first subset of beams for communication with the second wireless device 604 in descending order of the one or more first envelope ratios.

In one configuration, each direction in the first set of directions or the second set of directions may be associated with a (theta, phi) coordinate.

In one configuration, the first beam may be associated with a higher array gain than other beams in the first set of beams for communication with the second wireless device. The second beam may be associated with a higher array gain than other beams in the first subset of beams for communication with the second wireless device.

In one configuration, each beam in the first set of beams may be associated with a respective children list.

At 612, the first wireless device 602 may select a third beam for communication with the second wireless device 604 from a second subset of beams of a third set of beams based on an envelope area of the third beam intersecting the envelope area of the second beam. The third set of beams may be associated with a third beam level. The second beam may be associated with a second children list. The second children list may be associated with the second subset of beams of the third set of beams. Each beam in the second subset of beams may have an envelope area that intersects the envelope area of the second beam.

At 614, the first wireless device 602 may select a fourth beam for communication with the second wireless device from a third subset of beams of the first set of beams based on an envelope area of the fourth beam intersecting the envelope area of the second beam. The second beam may be associated with a first parents list. The first parents list may be associated with the third subset of beams of the first set of beams. Each beam in the third subset of beams may have an envelope area that intersects the envelope area of the second beam.

Figure 7:
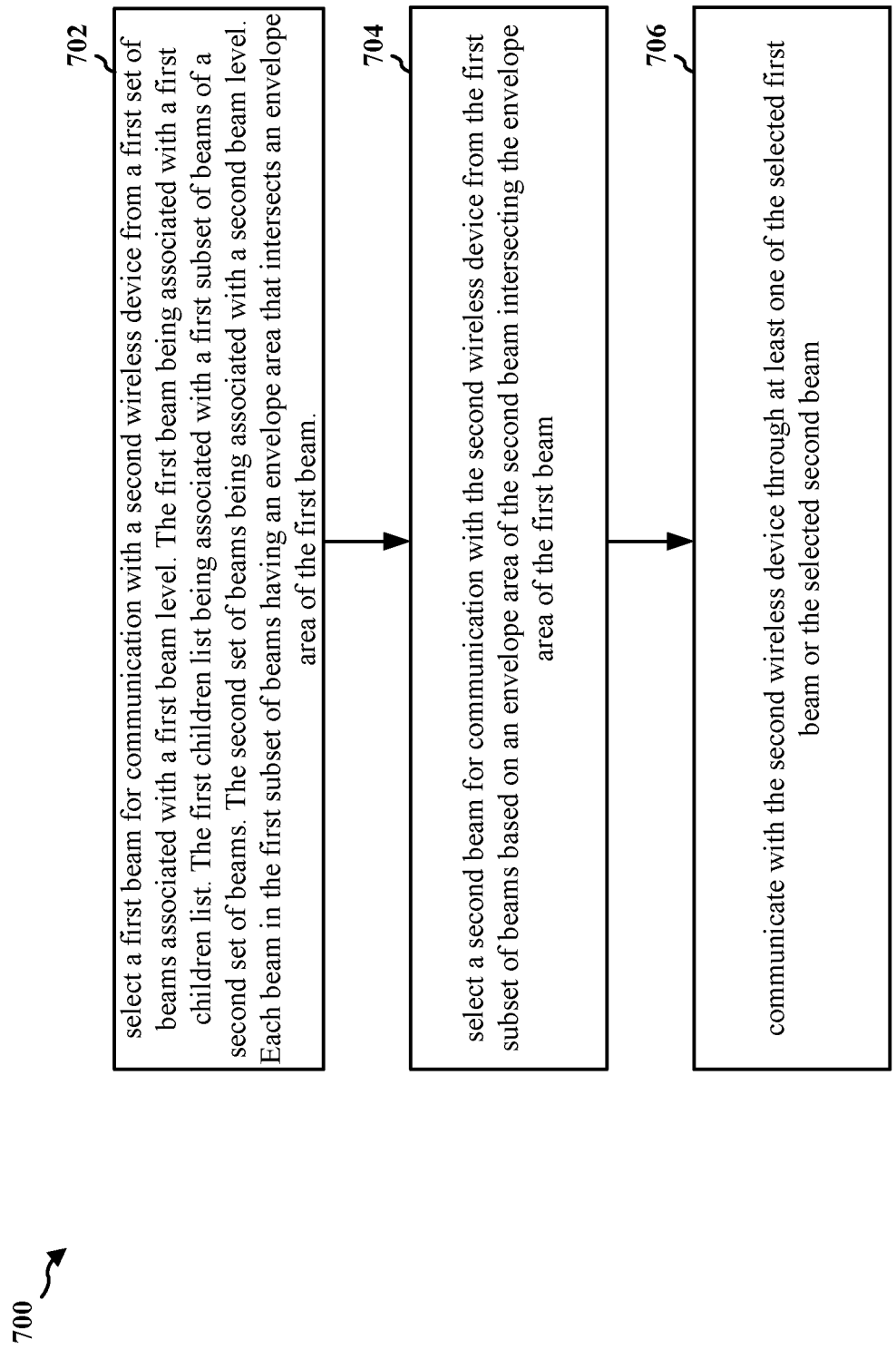
FIG. 7 is a flowchart of a method of wireless communication.

FIG. 7 is a flowchart 700 of a method of wireless communication. The method may be performed by a first wireless device (e.g., the UE 104/350; the base station 102/180/310; the first wireless device 602; the apparatus 902). At 702, the first wireless device may select a first beam for communication with a second wireless device from a first set of beams associated with a first beam level. A second set of beams may be associated with a second beam level. The first beam may be associated with a first children list. The first children list may be associated with a first subset of beams of the second set of beams. Each beam in the first subset of beams may have an envelope area that intersects an envelope area of the first beam. For example, 702 may be performed by the beam refinement component 940 in FIG. 9. Referring to FIG. 6, at 606, the first wireless device 602 may select a first beam for communication with a second wireless device 604 from a first set of beams associated with a first beam level.

At 704, the first wireless device may select a second beam for communication with the second wireless device from the first subset of beams based on an envelope area of the second beam intersecting the envelope area of the first beam. For example, 704 may be performed by the beam refinement component 940 in FIG. 9. Referring to FIG. 6, at 608, the first wireless device 602 may select a second beam for communication with the second wireless device 604 from the first subset of beams based on an envelope area of the second beam intersecting the envelope area of the first beam.

At 706, the first wireless device may communicate with the second wireless device through at least one of the selected first beam or the selected second beam. For example, 706 may be performed by the beam refinement component 940 in FIG. 9. Referring to FIG. 6, at 610, the first wireless device 602 may communicate with the second wireless device 604 through at least one of the selected first beam or the selected second beam.

Figure 8:
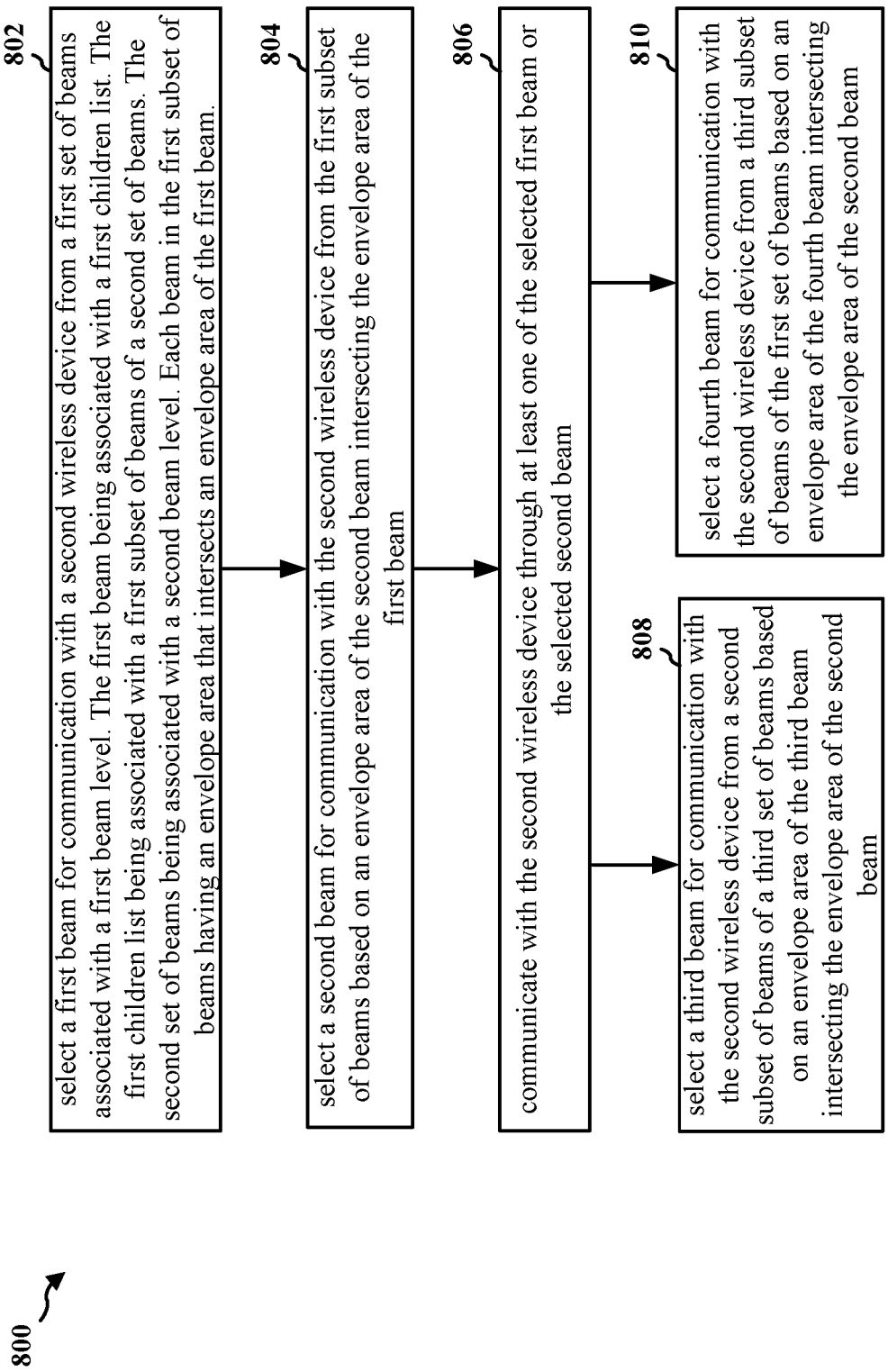
FIG. 8 is a flowchart of a method of wireless communication.

FIG. 8 is a flowchart 800 of a method of wireless communication. The method may be performed by a first wireless device (e.g., the UE 104/350; the base station 102/180/310; the first wireless device 602; the apparatus 902). At 802, the first wireless device may select a first beam for communication with a second wireless device from a first set of beams associated with a first beam level. A second set of beams may be associated with a second beam level. The first beam may be associated with a first children list. The first children list may be associated with a first subset of beams of the second set of beams. Each beam in the first subset of beams may have an envelope area that intersects an envelope area of the first beam. For example, 802 may be performed by the beam refinement component 940 in FIG. 9. Referring to FIG. 6, at 606, the first wireless device 602 may select a first beam for communication with a second wireless device 604 from a first set of beams associated with a first beam level.

At 804, the first wireless device may select a second beam for communication with the second wireless device from the first subset of beams based on an envelope area of the second beam intersecting the envelope area of the first beam. For example, 804 may be performed by the beam refinement component 940 in FIG. 9. Referring to FIG. 6, at 608, the first wireless device 602 may select a second beam for communication with the second wireless device 604 from the first subset of beams based on an envelope area of the second beam intersecting the envelope area of the first beam.

At 806, the first wireless device may communicate with the second wireless device through at least one of the selected first beam or the selected second beam. For example, 806 may be performed by the beam refinement component 940 in FIG. 9. Referring to FIG. 6, at 610, the first wireless device 602 may communicate with the second wireless device 604 through at least one of the selected first beam or the selected second beam.

In one configuration, the second beam may be narrower than the first beam. The second beam may be associated with a higher array gain for communication with the second wireless device than the first beam.

In one configuration, the envelope area of the first beam may correspond to a first set of directions in relation to an antenna array of the first wireless device in which the first beam is associated with a higher array gain than other beams in the first set of beams. The envelope area of the second beam may correspond to a second set of directions in relation to the antenna array of the first wireless device in which the second beam is associated with a higher array gain than other beams in the second set of beams.

In one configuration, each beam in the first subset of beams may be associated with a respective first envelope ratio of one or more first envelope ratios in relation to the first beam based on a respective proportion of intersection between the envelope area of the respective beam in the first subset of beams and the envelope area of the first beam.

In one configuration, referring to FIG. 6, to select the second beam, the first wireless device 602 may measure a plurality of array gains associated with a plurality of beams in the first subset of beams for communication with the second wireless device 604 in descending order of the one or more first envelope ratios.

In one configuration, each direction in the first set of directions or the second set of directions may be associated with a (theta, phi) coordinate.

In one configuration, the first beam may be associated with a higher array gain than other beams in the first set of beams for communication with the second wireless device. The second beam may be associated with a higher array gain than other beams in the first subset of beams for communication with the second wireless device.

In one configuration, each beam in the first set of beams may be associated with a respective children list.

In one configuration, at 808, the first wireless device may select a third beam for communication with the second wireless device from a second subset of beams of a third set of beams based on an envelope area of the third beam intersecting the envelope area of the second beam. The third set of beams may be associated with a third beam level. The second beam may be associated with a second children list. The second children list may be associated with the second subset of beams of the third set of beams. Each beam in the second subset of beams may have an envelope area that intersects the envelope area of the second beam. For example, 808 may be performed by the beam refinement component 940 in FIG. 9. Referring to FIG. 6, at 612, the first wireless device 602 may select a third beam for communication with the second wireless device 604 from a second subset of beams of a third set of beams based on an envelope area of the third beam intersecting the envelope area of the second beam.

In one configuration, at 810, the first wireless device may select a fourth beam for communication with the second wireless device from a third subset of beams of the first set of beams based on an envelope area of the fourth beam intersecting the envelope area of the second beam. The second beam may be associated with a first parents list. The first parents list may be associated with the third subset of beams of the first set of beams. Each beam in the third subset of beams may have an envelope area that intersects the envelope area of the second beam. For example, 810 may be performed by the beam refinement component 940 in FIG. 9. Referring to FIG. 6, at 614, the first wireless device 602 may select a fourth beam for communication with the second wireless device from a third subset of beams of the first set of beams based on an envelope area of the fourth beam intersecting the envelope area of the second beam.

Figure 9:
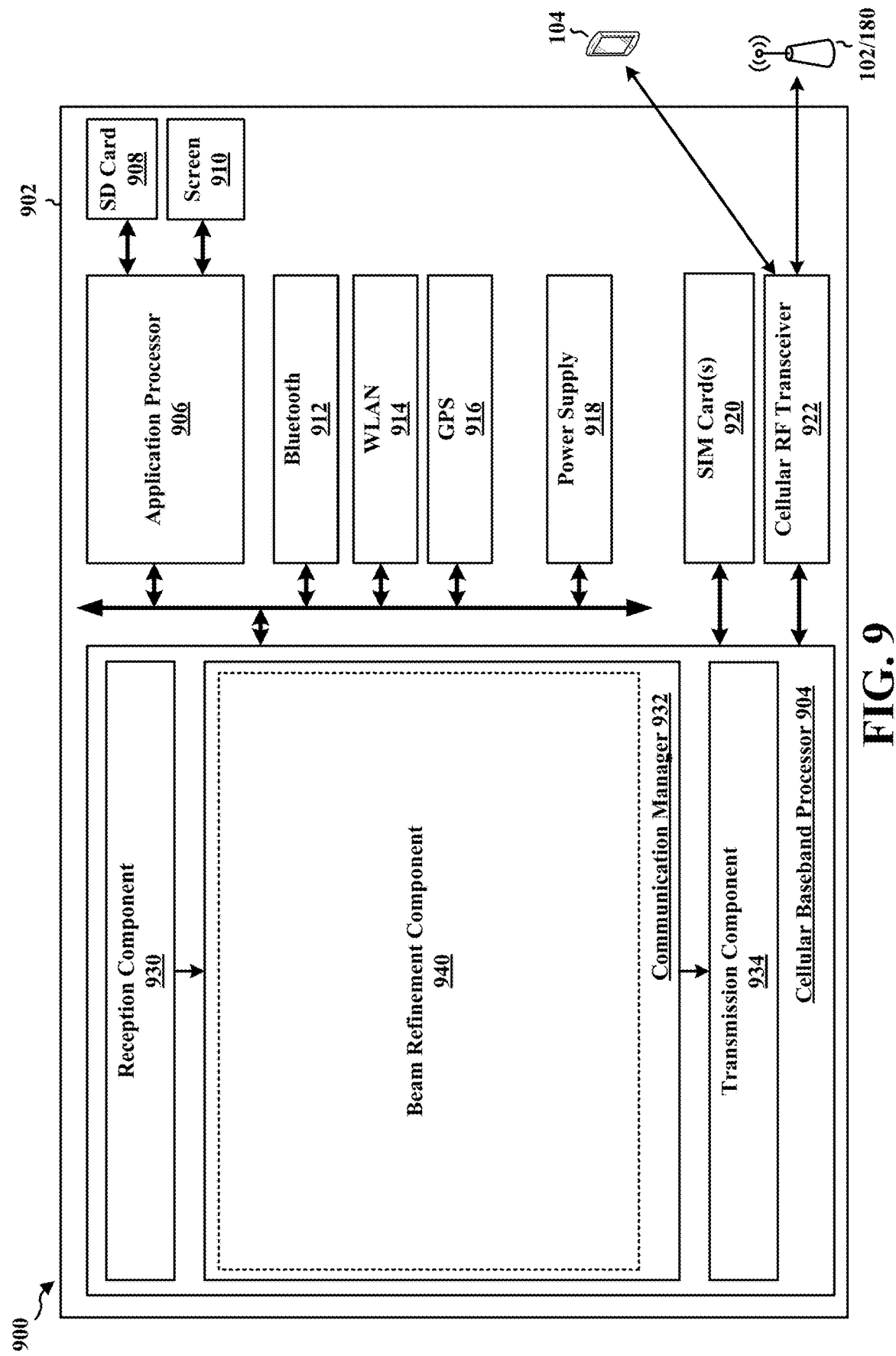
FIG. 9 is a diagram illustrating an example of a hardware implementation for an example apparatus.

FIG. 9 is a diagram 900 illustrating an example of a hardware implementation for an apparatus 902. The apparatus 902 may be a first wireless device, a component of a first wireless device, or may implement first wireless device functionality. For example, the apparatus 902 may be a UE, a base station, a CPE, or any other suitable wireless device, etc. In some aspects, the apparatus 902 may include a cellular baseband processor 904 (also referred to as a modem) coupled to a cellular RF transceiver 922. In some aspects, the apparatus 902 may further include one or more subscriber identity modules (SIM) cards 920, an application processor 906 coupled to a secure digital (SD) card 908 and a screen 910, a Bluetooth module 912, a wireless local area network (WLAN) module 914, a Global Positioning System (GPS) module 916, or a power supply 918. The cellular baseband processor 904 communicates through the cellular RF transceiver 922 with the UE 104 and/or BS 102/180. The cellular baseband processor 904 may include a computer-readable medium/memory. The computer-readable medium/memory may be non-transitory. The cellular baseband processor 904 is responsible for general processing, including the execution of software stored on the computer-readable medium/memory. The software, when executed by the cellular baseband processor 904, causes the cellular baseband processor 904 to perform the various functions described supra. The computer-readable medium/memory may also be used for storing data that is manipulated by the cellular baseband processor 904 when executing software. The cellular baseband processor 904 further includes a reception component 930, a communication manager 932, and a transmission component 934. The communication manager 932 includes the one or more illustrated components. The components within the communication manager 932 may be stored in the computer-readable medium/memory and/or configured as hardware within the cellular baseband processor 904. The cellular baseband processor 904 may be a component of the UE 350 and may include the memory 360 and/or at least one of the TX processor 368, the RX processor 356, and the controller/processor 359. In one configuration, the apparatus 902 may be a modem chip and include just the baseband processor 904, and in another configuration, the apparatus 902 may be the entire UE (e.g., see 350 of FIG. 3) and include the additional modules of the apparatus 902. In other examples, the baseband unit 904 may be a component of the base station 310 and may include the memory 376 and/or at least one of the TX processor 316, the RX processor 370, and the controller/processor 375.

The communication manager 932 includes a beam refinement component 940 that may be configured to select a first beam for communication with a second wireless device from a first set of beams associated with a first beam level, a second set of beams being associated with a second beam level, e.g., as described in connection with 702 in FIGS. 7 and 802 in FIG. 8. The beam refinement component 940 may be configured to select a second beam for communication with the second wireless device from the first subset of beams based on an envelope area of the second beam intersecting the envelope area of the first beam, e.g., as described in connection with 704 in FIGS. 7 and 804 in FIG. 8. The beam refinement component 940 may be configured to communicate with the second wireless device through at least one of the selected first beam or the selected second beam, e.g., as described in connection with 706 in FIGS. 7 and 806 in FIG. 8. The beam refinement component 940 may be configured to select a third beam for communication with the second wireless device from a second subset of beams of a third set of beams based on an envelope area of the third beam intersecting the envelope area of the second beam, e.g., as described in connection with 808 in FIG. 8. The beam refinement component 940 may be configured to select a fourth beam for communication with the second wireless device from a third subset of beams of the first set of beams based on an envelope area of the fourth beam intersecting the envelope area of the second beam, e.g., as described in connection with 810 in FIG. 8.

The apparatus may include additional components that perform each of the blocks of the algorithm in the flowcharts of FIGS. 6-8. As such, each block in the flowcharts of FIGS. 6-8 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

As shown, the apparatus 902 may include a variety of components configured for various functions. In one configuration, the apparatus 902, and in particular the cellular baseband processor 904, includes means for selecting a first beam for communication with a second wireless device from a first set of beams associated with a first beam level. A second set of beams may be associated with a second beam level. The first beam may be associated with a first children list. The first children list may be associated with a first subset of beams of the second set of beams. Each beam in the first subset of beams may have an envelope area that intersects an envelope area of the first beam. The apparatus 902, and in particular the cellular baseband processor 904, includes means for selecting a second beam for communication with the second wireless device from the first subset of beams based on an envelope area of the second beam intersecting the envelope area of the first beam. The apparatus 902, and in particular the cellular baseband processor 904, includes means for communicating with the second wireless device through at least one of the selected first beam or the selected second beam.

In one configuration, the second beam may be narrower than the first beam. The second beam may be associated with a higher array gain for communication with the second wireless device than the first beam. In one configuration, the envelope area of the first beam may correspond to a first set of directions in relation to an antenna array of the first wireless device in which the first beam is associated with a higher array gain than other beams in the first set of beams. The envelope area of the second beam may correspond to a second set of directions in relation to the antenna array of the first wireless device in which the second beam is associated with a higher array gain than other beams in the second set of beams. In one configuration, each beam in the first subset of beams may be associated with a respective first envelope ratio of one or more first envelope ratios in relation to the first beam based on a respective proportion of intersection between the envelope area of the respective beam in the first subset of beams and the envelope area of the first beam. In one configuration, the means for selecting the second beam may be further configured to measure a plurality of array gains associated with a plurality of beams in the first subset of beams for communication with the second wireless device in descending order of the one or more first envelope ratios. In one configuration, each direction in the first set of directions or the second set of directions may be associated with a (theta, phi) coordinate. In one configuration, the first beam may be associated with a higher array gain than other beams in the first set of beams for communication with the second wireless device. The second beam may be associated with a higher array gain than other beams in the first subset of beams for communication with the second wireless device. In one configuration, each beam in the first set of beams may be associated with a respective children list. In one configuration, the apparatus 902, and in particular the cellular baseband processor 904, includes means for selecting a third beam for communication with the second wireless device from a second subset of beams of a third set of beams based on an envelope area of the third beam intersecting the envelope area of the second beam. The third set of beams may be associated with a third beam level. The second beam may be associated with a second children list. The second children list may be associated with the second subset of beams of the third set of beams. Each beam in the second subset of beams may have an envelope area that intersects the envelope area of the second beam. In one configuration, the apparatus 902, and in particular the cellular baseband processor 904, includes means for selecting a fourth beam for communication with the second wireless device from a third subset of beams of the first set of beams based on an envelope area of the fourth beam intersecting the envelope area of the second beam. The second beam may be associated with a first parents list. The first parents list may be associated with the third subset of beams of the first set of beams. Each beam in the third subset of beams may have an envelope area that intersects the envelope area of the second beam.

The means may be one or more of the components of the apparatus 902 configured to perform the functions recited by the means. As described supra, the apparatus 902 may include the TX Processor 368, the RX Processor 356, and the controller/processor 359. As such, in one configuration, the means may be the TX Processor 368, the RX Processor 356, and the controller/processor 359 configured to perform the functions recited by the means.

Referring back to FIGS. 5A-9, a first wireless device may select a first beam for communication with a second wireless device from a first set of beams associated with a first beam level. A second set of beams may be associated with a second beam level. The first beam may be associated with a first children list. The first children list may be associated with a first subset of beams of the second set of beams. Each beam in the first subset of beams may have an envelope area that intersects an envelope area of the first beam. The first wireless device may select a second beam for communication with the second wireless device from the first subset of beams based on an envelope area of the second beam intersecting the envelope area of the first beam. The first wireless device may communicate with the second wireless device through at least one of the selected first beam or the selected second beam. A children list generated based on the envelope ratio metric may be more accurate and shorter than a children list generated based on the overlap ratio. The child beam order in the children list may be more suitable as well. Accordingly, in the hierarchical beam refinement process, the first wireless device may measure fewer beams, and may be more likely to measure more suitable child beams sooner. The beam refinement process may be completed sooner with better results.

It is understood that the specific order or hierarchy of blocks in the processes/flowcharts disclosed is an illustration of example approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Terms such as "if," "when," and "while" should be interpreted to mean "under the condition that" rather than imply an immediate temporal relationship or reaction. That is, these phrases, e.g., "when," do not imply an immediate action in response to or during the occurrence of an action, but simply imply that if a condition is met then an action will occur, but without requiring a specific or immediate time constraint for the action to occur. The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device,"

and the like may not be a substitute for the word "means." As such, no claim element is to be construed as a means plus function unless the element is expressly recited using the phrase "means for."

The following aspects are illustrative only and may be combined with other aspects or teachings described herein, without limitation.

Aspect 1 is an apparatus for wireless communication at a first wireless device including at least one processor coupled to a memory and configured to select a first beam for communication with a second wireless device from a first set of beams associated with a first beam level, a second set of beams being associated with a second beam level, the first beam being associated with a first children list, the first children list being associated with a first subset of beams of the second set of beams, each beam in the first subset of beams having an envelope area that intersects an envelope area of the first beam; select a second beam for communication with the second wireless device from the first subset of beams based on an envelope area of the second beam intersecting the envelope area of the first beam; and communicate with the second wireless device through at least one of the selected first beam or the selected second beam.

Aspect 2 is the apparatus of aspect 1, where the second beam is narrower than the first beam, and the second beam is associated with a higher array gain for communication with the second wireless device than the first beam.

Aspect 3 is the apparatus of any of aspects 1 to 2, where the envelope area of the first beam corresponds to a first set of directions in relation to an antenna array of the first wireless device in which the first beam is associated with a higher array gain than other beams in the first set of beams, and the envelope area of the second beam corresponds to a second set of directions in relation to the antenna array of the first wireless device in which the second beam is associated with a higher array gain than other beams in the second set of beams.

Aspect 4 is the apparatus of aspect 3, where each beam in the first subset of beams is associated with a respective first envelope ratio of one or more first envelope ratios in relation to the first beam based on a respective proportion of intersection between the envelope area of the respective beam in the first subset of beams and the envelope area of the first beam.

Aspect 5 is the apparatus of aspect 4, where to select the second beam, the at least one processor is further configured to measure a plurality of array gains associated with a plurality of beams in the first subset of beams for communication with the second wireless device in descending order of the one or more first envelope ratios.

Aspect 6 is the apparatus of any of aspects 3 to 5, where each direction in the first set of directions or the second set of directions is associated with a (theta, phi) coordinate.

Aspect 7 is the apparatus of any of aspects 1 to 6, where the first beam is associated with a higher array gain than other beams in the first set of beams for communication with the second wireless device, and the second beam is associated with a higher array gain than other beams in the first subset of beams for communication with the second wireless device.

Aspect 8 is the apparatus of any of aspects 1 to 7, where each beam in the first set of beams is associated with a respective children list.

Aspect 9 is the apparatus of any of aspects 1 to 8, the at least one processor being further configured to: select a third beam for communication with the second wireless device from a second subset of beams of a third set of beams based on an envelope area of the third beam intersecting the envelope area of the second beam, where the third set of beams is associated with a third beam level, the second beam is associated with a second children list, the second children list is associated with the second subset of beams of the third set of beams, and each beam in the second subset of beams has an envelope area that intersects the envelope area of the second beam.

Aspect 10 is the apparatus of any of aspects 1 to 8, the at least one processor being further configured to: select a fourth beam for communication with the second wireless device from a third subset of beams of the first set of beams based on an envelope area of the fourth beam intersecting the envelope area of the second beam, where the second beam is associated with a first parents list, the first parents list is associated with the third subset of beams of the first set of beams, and each beam in the third subset of beams has an envelope area that intersects the envelope area of the second beam.

Aspect 11 is the apparatus of any of aspects 1 to 9, further including a transceiver coupled to the at least one processor.

Aspect 12 is a method of wireless communication for implementing any of aspects 1 to 11.

Aspect 13 is an apparatus for wireless communication including means for implementing any of aspects 1 to 11.

Aspect 14 is a computer-readable medium storing computer executable code, where the code when executed by a processor causes the processor to implement any of aspects 1 to 11.

What is claimed is:

1. An apparatus for wireless communication at a first wireless device, comprising:
   a memory; and
   at least one processor coupled to the memory and configured to:
      select a first beam for communication with a second wireless device from a first set of beams associated with a first beam level, the first beam being associated with a first children list, the first children list being associated with a first subset of beams of a second set of beams, the second set of beams being associated with a second beam level, each beam in the first subset of beams having an envelope area that intersects an envelope area of the first beam;
      select a second beam for communication with the second wireless device from the first subset of beams based on an envelope area of the second beam intersecting the envelope area of the first beam; and
      communicate with the second wireless device through at least one of the selected first beam or the selected second beam.

2. The apparatus of claim 1, wherein the second beam is narrower than the first beam, and the second beam is associated with a higher array gain for communication with the second wireless device than the first beam.

3. The apparatus of claim 1, wherein the envelope area of the first beam corresponds to a first set of directions in relation to an antenna array of the first wireless device in which the first beam is associated with a higher array gain than other beams in the first set of beams, and the envelope area of the second beam corresponds to a second set of directions in relation to the antenna array of the first wireless device in which the second beam is associated with a higher array gain than other beams in the second set of beams.

4. The apparatus of claim 3, wherein each beam in the first subset of beams is associated with a respective first envelope ratio of one or more first envelope ratios in relation to the first beam based on a respective proportion of intersection between the envelope area of the respective beam in the first subset of beams and the envelope area of the first beam.

5. The apparatus of claim 4, wherein to select the second beam, the at least one processor is further configured to measure a plurality of array gains associated with a plurality of beams in the first subset of beams for communication with the second wireless device in descending order of the one or more first envelope ratios.

6. The apparatus of claim 3, wherein each direction in the first set of directions or the second set of directions is associated with a (theta, phi) coordinate.

7. The apparatus of claim 1, wherein the first beam is associated with a higher array gain than other beams in the first set of beams for communication with the second wireless device, and the second beam is associated with a higher array gain than other beams in the first subset of beams for communication with the second wireless device.

8. The apparatus of claim 1, wherein each beam in the first set of beams is associated with a respective children list.

9. The apparatus of claim 1, the at least one processor being further configured to:
select a third beam for communication with the second wireless device from a second subset of beams of a third set of beams based on an envelope area of the third beam intersecting the envelope area of the second beam, wherein the third set of beams is associated with a third beam level, the second beam is associated with a second children list, the second children list is associated with the second subset of beams of the third set of beams, and each beam in the second subset of beams has an envelope area that intersects the envelope area of the second beam.

10. The apparatus of claim 1, the at least one processor being further configured to:
select a fourth beam for communication with the second wireless device from a third subset of beams of the first set of beams based on an envelope area of the fourth beam intersecting the envelope area of the second beam, wherein the second beam is associated with a first parents list, the first parents list is associated with the third subset of beams of the first set of beams, and each beam in the third subset of beams has an envelope area that intersects the envelope area of the second beam.

11. The apparatus of claim 1, further comprising a transceiver coupled to the at least one processor.

12. A method of wireless communication at a first wireless device, comprising:
selecting a first beam for communication with a second wireless device from a first set of beams associated with a first beam level, the first beam being associated with a first children list, the first children list being associated with a first subset of beams of a second set of beams, the second set of beams being associated with a second beam level, each beam in the first subset of beams having an envelope area that intersects an envelope area of the first beam;
selecting a second beam for communication with the second wireless device from the first subset of beams based on an envelope area of the second beam intersecting the envelope area of the first beam; and
communicating with the second wireless device through at least one of the selected first beam or the selected second beam.

13. The method of claim 12, wherein the second beam is narrower than the first beam, and the second beam is associated with a higher array gain for communication with the second wireless device than the first beam.

14. The method of claim 12, wherein the envelope area of the first beam corresponds to a first set of directions in relation to an antenna array of the first wireless device in which the first beam is associated with a higher array gain than other beams in the first set of beams, and the envelope area of the second beam corresponds to a second set of directions in relation to the antenna array of the first wireless device in which the second beam is associated with a higher array gain than other beams in the second set of beams.

15. The method of claim 14, wherein each beam in the first subset of beams is associated with a respective first envelope ratio of one or more first envelope ratios in relation to the first beam based on a respective proportion of intersection between the envelope area of the respective beam in the first subset of beams and the envelope area of the first beam.

16. The method of claim 15, wherein selecting the second beam further comprises measuring a plurality of array gains associated with a plurality of beams in the first subset of beams for communication with the second wireless device in descending order of the one or more first envelope ratios.

17. The method of claim 14, wherein each direction in the first set of directions or the second set of directions is associated with a (theta, phi) coordinate.

18. The method of claim 12, wherein the first beam is associated with a higher array gain than other beams in the first set of beams for communication with the second wireless device, and the second beam is associated with a higher array gain than other beams in the first subset of beams for communication with the second wireless device.

19. The method of claim 12, wherein each beam in the first set of beams is associated with a respective children list.

20. The method of claim 12, further comprising:
selecting a third beam for communication with the second wireless device from a second subset of beams of a third set of beams based on an envelope area of the third beam intersecting the envelope area of the second beam, wherein the third set of beams is associated with a third beam level, the second beam is associated with a second children list, the second children list is associated with the second subset of beams of the third set of beams, and each beam in the second subset of beams has an envelope area that intersects the envelope area of the second beam.

21. The method of claim 12, further comprising:
selecting a fourth beam for communication with the second wireless device from a third subset of beams of the first set of beams based on an envelope area of the fourth beam intersecting the envelope area of the second beam, wherein the second beam is associated with a first parents list, the first parents list is associated with the third subset of beams of the first set of beams, and each beam in the third subset of beams has an envelope area that intersects the envelope area of the second beam.

22. An apparatus for wireless communication at a first wireless device, comprising:
means for selecting a first beam for communication with a second wireless device from a first set of beams associated with a first beam level, the first beam being associated with a first children list, the first children list being associated with a first subset of beams of a second set of beams, the second set of beams being associated with a second beam level, each beam in the first subset of beams having an envelope area that intersects an envelope area of the first beam;

means for selecting a second beam for communication with the second wireless device from the first subset of beams based on an envelope area of the second beam intersecting the envelope area of the first beam; and means for communicating with the second wireless device through at least one of the selected first beam or the selected second beam.

23. The apparatus of claim 22, wherein the second beam is narrower than the first beam, and the second beam is associated with a higher array gain for communication with the second wireless device than the first beam.

24. The apparatus of claim 22, wherein the envelope area of the first beam corresponds to a first set of directions in relation to an antenna array of the first wireless device in which the first beam is associated with a higher array gain than other beams in the first set of beams, and the envelope area of the second beam corresponds to a second set of directions in relation to the antenna array of the first wireless device in which the second beam is associated with a higher array gain than other beams in the second set of beams.

25. The apparatus of claim 24, wherein each beam in the first subset of beams is associated with a respective first envelope ratio of one or more first envelope ratios in relation to the first beam based on a respective proportion of intersection between the envelope area of the respective beam in the first subset of beams and the envelope area of the first beam.

26. The apparatus of claim 25, wherein the means for selecting the second beam is further configured to measure a plurality of array gains associated with a plurality of beams in the first subset of beams for communication with the second wireless device in descending order of the one or more first envelope ratios.

27. The apparatus of claim 24, wherein each direction in the first set of directions or the second set of directions is associated with a (theta, phi) coordinate.

28. The apparatus of claim 22, wherein the first beam is associated with a higher array gain than other beams in the first set of beams for communication with the second wireless device, and the second beam is associated with a higher array gain than other beams in the first subset of beams for communication with the second wireless device.

29. The apparatus of claim 22, wherein each beam in the first set of beams is associated with a respective children list.

30. A non-transitory computer-readable medium storing computer executable code at a first wireless device, the code when executed by a processor causes the processor to:

select a first beam for communication with a second wireless device from a first set of beams associated with a first beam level, the first beam being associated with a first children list, the first children list being associated with a first subset of beams of a second set of beams, the second set of beams being associated with a second beam level, each beam in the first subset of beams having an envelope area that intersects an envelope area of the first beam;

select a second beam for communication with the second wireless device from the first subset of beams based on an envelope area of the second beam intersecting the envelope area of the first beam; and communicate with the second wireless device through at least one of the selected first beam or the selected second beam.

* * * * *